United States Patent [19]

Chin-Long

[11] Patent Number: 5,331,870
[45] Date of Patent: Jul. 26, 1994

[54] APPARATUS AND METHOD FOR USE IN CONTROLLING MACHINING CHIP AND LENGTH OF SUCH MACHINING CHIP

[76] Inventor: Wu Chin-Long, No. 136-12, Young Ho Road, Ta Ya Hsiang, Taichung Hsien, Taiwan

[21] Appl. No.: 968,324

[22] Filed: Oct. 29, 1992

[51] Int. Cl.$^5$ .................. B23B 1/00; B23B 29/00
[52] U.S. Cl. ........................... 82/1.11; 82/158; 82/904
[58] Field of Search .............. 82/1.11, 118, 134, 137, 82/158, 904

[56] References Cited

U.S. PATENT DOCUMENTS

| | | | |
|---|---|---|---|
| 3,559,259 | 2/1971 | Kumabe | 82/904 |
| 4,203,062 | 5/1980 | Bathen | 82/137 |
| 4,646,595 | 3/1987 | Slee | 82/118 |
| 4,683,788 | 8/1987 | Kronawittlelithner et al. | 82/904 |
| 4,864,904 | 9/1989 | Mishiro | 82/137 |
| 5,019,115 | 5/1991 | Schneider et al. | 82/1.11 |
| 5,022,294 | 6/1991 | Higuchi et al. | 82/18 |
| 5,054,340 | 10/1991 | Sugita et al. | 82/18 |
| 5,113,728 | 5/1992 | Medeksza | 82/1.11 |

Primary Examiner—William E. Terrell

[57] ABSTRACT

An apparatus and a method for controlling machining chip and the length of such chip make use of a lathe tool support on which an electromagnetic tool mount is disposed. The electromagnetic tool mount comprises a front clamping block and a rear clamping block for holding a machining tool. An electromagnetic coil located between the front and the rear clamping blocks is provided at the center thereof with a throgh hole for receiving the machining tool. The resumption and the interruption of power supply to the electromagnetic coil are regulated by the amplified signals sent out by an oscillation controlling circuit. The magnitude of power voltage and the cycle of power resumption of the electromagnetic coil are so adjusted as to facilitate the magnetization and the demagnetization of the machining tool. The machining chip is broken by a magnetically induced thrust and a shearing force generated by the rotation of the machining tool.

8 Claims, 6 Drawing Sheets

| NO | TEST CONDITIONS ||||| TEST RESULTS ||
|---|---|---|---|---|---|---|---|
| | MACHINING DEPTH d (mm) | FEEDING RATE Vf (mm/rev) | COOLING LIQUID | MACHINING SPEED V (mm/sec) | PERIOD t (ms) | CHIP LENGTH L (mm) | SHAPE OF MACHINING SHIP 10mm |
| 1 | 0.3 | 0.2 | YES | 306.68 | 41 | 12.0 |  |
| 2 | 0.6 | 0.4 | YES | 487.40 | 29 | 13.6 |  |
| 3 | 0.3 | 0.1 | NO | 516.63 | 20 | 10.0 |  |
| 4 | 0.4 | 0.2 | NO | 589.96 | 18 | 10.4 |  |
| 5 | 0.4 | 0.4 | NO | 369.33 | 35 | 12.2 |  |
| 6 | 0.2 | 0.2 | YES | 329.50 | 18 | 5.5 |  |
| 7 | 0.3 | 0.3 | NO | 607.34 | 20 | 12.1 |  |
| 8 | 0.7 | 0.2 | NO | 244.25 | 18 | 4.2 |  |
| 9 | 0.1 | 0.1 | NO | 264.03 | 0 | THIN PIECES GRANULATED PIECES |  |

APPARATUS AND METHOD FOR USE IN CONTROLLING MACHINING CHIP AND LENGTH OF SUCH MACHINING CHIP

BACKGROUND OF THE INVENTION

The present invention relates to controls of the chip and the length of such chip which is produced in a machining process of an iron material or an iron alloy material, and more particularly to an apparatus and a method which are based on the electromagnetic principle for use in controlling the machining chip and the length of such machining chip.

An iron material and an iron alloy material are widely used in making various mechanical components or the structures of a machinery by machining process, in view of the fact that both the iron material and the iron alloy material have an excellent mechanical property and an excellent machinability. With the exception of a cast iron chip which is broken into small pieces in the machining process, an iron chip or an iron alloy chip produced in the machining process is generally in the form of a long and unbroken piece. Such long and unbroken chip can get twisted easily with a cutting tools, work pieces and machine parts. The operatior is often annoyed by such incident, which also can bring about an interruption of machining and can affect adversely the overall efficiency of the machining operation. Moreover, such incident can be hazardous to the operator's safety and can cause damages to the cutting edge of the machining tool, the work piece, and even the machinery. The long and unbroken piece of the machining chip has a high bulk ratio and is therefore difficult to be disposed of economically. The machining process has become automated and robotized, with the emphasis placed on a high metal removal rate. Such modern machining process is by no means free from the operational problems decribed above, as long as the problem of the long and unbroken pieces of the machining chip persists.

The prior art method of breaking apart the long machining chip comprises a lathe tool having a means capable of breaking apart the chip. As shown in FIG. 1, there are two kinds of such lathe tool. The FIGS. 1A and 1B show the groove type while the FIGS. 1C and 1D show the obstruction type. The surface of the lathe tool is provided with the groove or the obstruction piece located at an appropriate position presumed to be on the machining path. In addition, the machining conditions are selected in conformity with the shape of the chip breaking apparatus. For example, the machining depth, the machining speed, and the state in which the chip is under a high bending stress to reach a critical chip breaking curvature diameter at such time when the chip passes against the surface of the lathe tool are all taken into consideration so as to achieve an effective control of the chip breaking process. An alternative method is to guide the machining chip to smash into the machining transient surface S1 or into the belly surface S2 of the lathe tool so as to cause the chip to tear apart, as shown in FIGS. 2A and 2B.

There are many factors that affect the breakage of the machining chip. Such factors include the geometric shape of the cutting tool, the machining conditions such as the machining depth, the feed amount of the machining tool, the machining speed and so forth, the material quality of the work piece, and the circumstances under which the machining process takes place, such as the way that the chip wafts, the divergence of directions in which the chip twists, and the extent of the bending stress exerting on the chip upon being twisted. According to the chip breaking apparatus of the prior art, the surface of the cutting tool is provided at an appropriate location thereof with a groove or an obstruction piece of an appropriate shape so as to set up the geometric shape of the surface of the cutting tool and to select the machining conditions under which the chip breaking apparatus is used suitably to maximize the chip breaking effect. However, such prior art method is limited in design in that it fails to control effectively the all possible factors that affect the chip breaking operation, and that the geometric shape of the surface of the cutting tool is so fixed that it can not be changed in accordance with the changing conditions and circumstances of the machining process. In other words, the prior art method of the chip breaking is so limited that the machining tool is permitted to have only one kind of the geometric shape and that the effect of the chip breaking action is greatly undermined.

SUMMARY OF THE INVENTION

It is, therefore, the primary objective of the present invention to provide an apparatus and a method for use in controlling the machining chip and the length of such chip. Such apparatus and method are capable of controlling effectively all the possible factors that affect the breaking process of the machining chip produced in the machining process of the work piece of an iron material or iron alloy material. In addition, the apparatus and the method allow the operator to control at will the length of a single piece of the machining chip.

It is another objective of the present invention to provide an apparatus and a method for use in controlling the chip and the length of such chip. Such apparatus and method can be so easily implemented as to control handily the length of the machining chip.

In keeping with the principles of the present invention, the foregoing objectives of the present invention are accomplished by an apparatus and a method for use in controlling the machining chip and the length of such chip. The present invention is characterized in that the machining tool is mounted on an electromagnetic tool capable of magnetizing the machining tool, which in turn brings about a magnetic induction of a machining chip produced during the machining process of a work piece made of an iron material or an iron alloy material. As a result, the shearing areas of the chip are subjected to an excessive distortion, which results in the breakage of the chip.

The present invention is further characterized in that it includes an electromagnetic device which is in communication with an oscillator capable of adjusting an electric voltage and frequency. The cycle of the machining tool being magnetized and demagnetized is therefore set up by means of the frequency of the oscillator. As a result, the magnetized machining tool is capable of inducing the breakage of the machining chip which passes by the surface of the magnetized machining tool. On the other hand, the chip can pass by the surface of the demagnetized machining tool without interference. As a result, the length of the broken chip can be controlled at will on the basis of the following equation, in which V stands for the machining velocity; t for the magnetizing and demagnetizing cycle of the machining tool; and L for the length of the chip.

$V_t = L$

The foregoing objectives, structures, functions and features of the present invention will be better understood by studying the following detailed description of a preferred embodiment of the present invention, in conjunction with the drawings provided herewith.

DETAILED DESCRIPTION OF THE PREFERRED EMBODIMENT

Figure 1A:
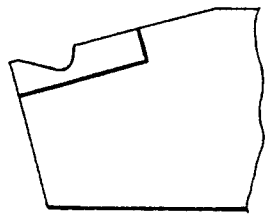
FIG. 1 (ABCD) shows a schematic view of a lathe tool having a chip breaking structure, according to the prior art.
Figure 1B:
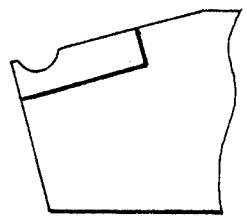
Figure 1C:
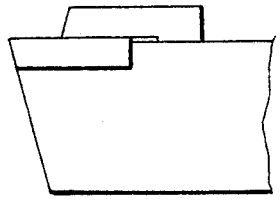
Figure 1D:
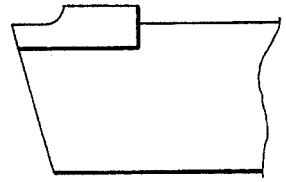
Figure 2A:
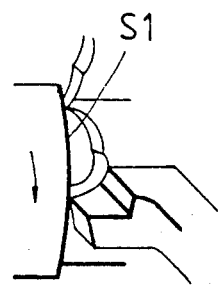
FIG. 2 (A&B) is a schematic view showing the breakage of the machining chip during the machining work, according to the prior art.
Figure 2B:
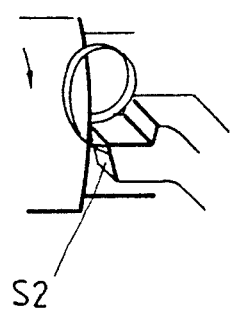
Figure 3:
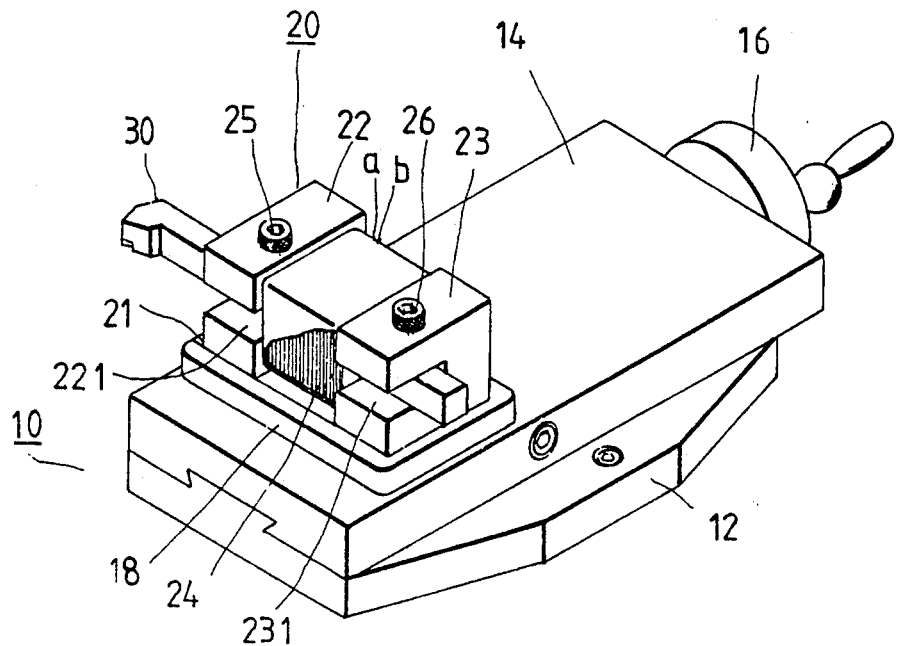
FIG. 3 shows a perspective view of an apparatus capable of controlling a machining chip and the length of such chip, according to the present invention.
Figure 4:
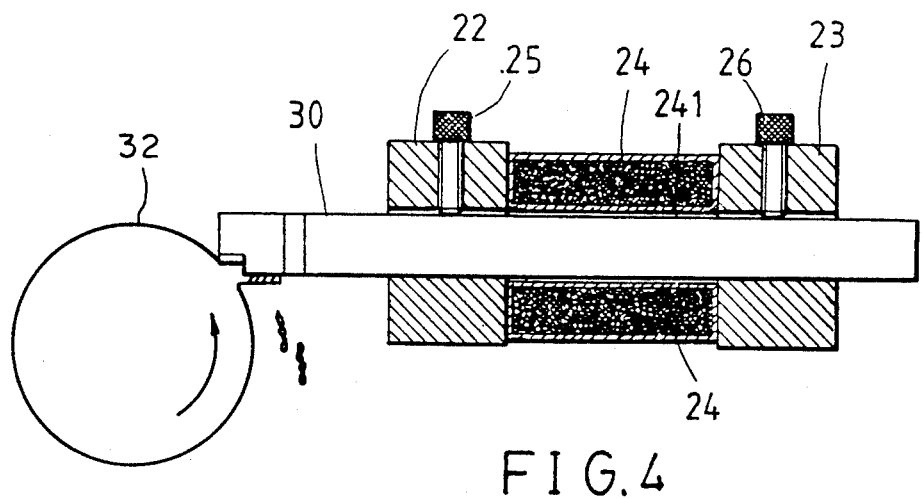
FIG. 4 shows a sectional view of a portion taken along the line 4—4 as shown in FIG. 3.

Referring to FIGS. 3 and 4, an apparatus controlling a machining chip and the length of such chip of the present invention is shown to be mounted on a conventional lathe, which has a lathe tool support 10 provided thereon with an electromagnetic tool mount 20. The lathe tool support 10 comprises a bottom board 12 and a sliding board 14, which are actuated by a hand wheel 16 to move in relation to each other. The sliding board 14 has a swiveling block 18 mounted thereon. The structures described above are parts of a conventional lathe of the prior art. The electromagnetic tool mount 20 is mounted on the swiveling block 18 of the sliding board 14 and is composed of a positioning block 21 provided thereon with a front clamping block 22, a rear clamping block 23 and an electromagnetic coil 24. The front and the rear clamping blocks 22 and 23 are provided respectively with through holes 221 and 231 for a lathe tool 30 to pass therethrough. The lathe tool 30 is fastened securely by means of two screws 25 and 26. The electromagnetic coil 24 takes the form of either a square tube or a cylindrical tube and has a through hole 241 located at the center thereof for the lathe tool 30 to pass therethrough. The input lines a and b of the power supply to the electromagnetic coil 24 are connected with the points a and b of the oscillation circuit 40. Rotating workpiece 32 is in position for machining by the cutting end of tool 30 and is shown in rotation in the direction of the arrow thereon with machining chips breaking from the machined portion.

Figure 5:
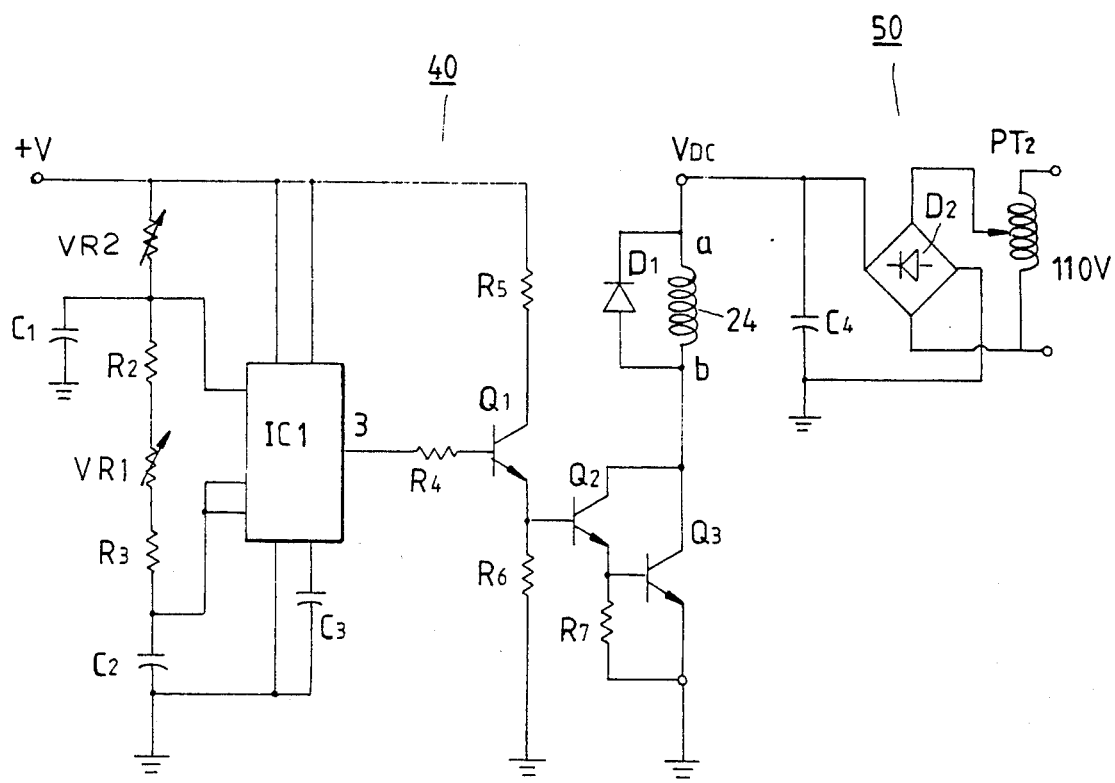
FIG. 5 shows an oscillation controlling circuitry of the present invention.

As shown in FIG. 5, the oscillation circuit 40 is composed of a NE555 oscillator IC1, whose connecting feet are respectively in communication with three capacitors C1, C2 and C3, and with resistors R2 and R3, and variable resistor VR2, and further with a variable resistor VR1 through which the frequency of the output oscillating signal of the third foot of the oscillator IC1 is adjusted. The oscillating signal drives a transistor Q1 via the resistor R4. The resistors R5 and R6 are connected in series with the transistor Q1 so as to permit the signal to be amplified via the transistors Q2 and Q3 for turning on the direct current power supply to the electromagnetic coil 24, which is connected with a diode D1. The direct current power supply VDC of the electromagnetic coil 24 is provided by a direct current voltage adjusting circuit 50 which is composed of an autotransformer PT2 capable of alterating the input power voltage. The direct current is made available via a diode bridge-type rectifier D2 and a wave filter C4 to the electromagnetic coil 24. The magnitude of the magnetic force of the electromagnetic coil 24 is regulated through the autotransformer PT2 capable of adjusting the magnitude of the voltage of the power supply to the electromagnetic coil 24.

The operation of the apparatus controlling the machining chip and the length of such chip is elucidated hereinafter.

As the power is made available to the oscillation controlling circuit 40, the oscillator IC1 sends out a signal of a predetermined frequency to drive the transistors Q1, Q2 and Q3 at the same frequency. The signal is amplified before it is to connect in an alternating manner the electromagnetic coil 24. The actuating frequency of the signal is adjusted by the variable resistor VR1 while the magnitude of the voltage of the power supply to the electromagnetic coil 24 is adjusted by the auto-transformer PT2 so that the magnetic force of the electromagnetic coil 24 can be adjusted likewise. As the power supply are made available to the electromagnetic coil 24, both ends of the machining tool 30 is magnetized to generate a magnetic field on the cutting edge of the tool. Therefore, a machining chip that passes the surface of the machining tool is attracted and held to the tool surface, thereby resulting in a reduction in the moving speed of the machine chip. As the machining process persists, the fresh machining chip moves faster than the previous chip whose movement is hampered by the magnetic field of the machining tool. As a result, the fresh chip exerts a thrust on the old chip. In the meantime, the rotations of the work piece and the machining tool bring about a shearing effect. The combined effects of a thrust and a shearing force work to break the machining chip.

Furthermore, the electromagnetic tool mount 20 can be connected with the oscillation controlling circuit 40. Therefore, the machining tool 30 can be either magnetized or demagnetized by adjusting the magnitude of the output frequency of the oscillator IC1. The machining chip can pass by the tool surface without the magnetic interference at such time when the machining tool is demagnetized. On the other hand, the machining chip encounters with a thrust and a shearing force while passing by the tool surface at such time when the machining tool 30 is magnetized. The length of the broken chip can be therefore regulated by such periodic events of demagnetization and magnetization of the machining tool 30. The length of such cycle of magnetization and demagnetization can be set by adjusting the magnitude of the frequency of the oscillator IC1, thanks to the cycle t being the inverse of the frequency f, as expressed by an equation of $t=1/f$. The desired length of the broken chip can be thus set on the basis of an equation of $Vt=L$, in which V stands for the machining speed, t for the magnetization and demagnetization cycle, and L for the length of the machining chip intended to be broken apart.

Figure 9:
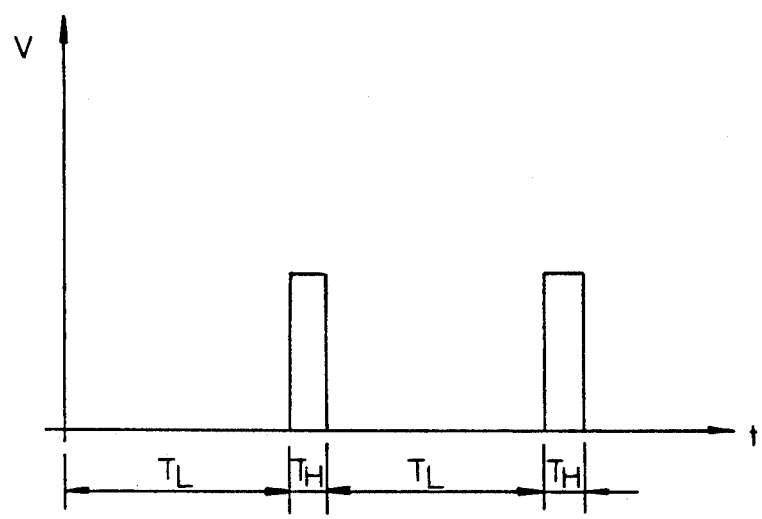
FIG. 9 shows a graph of applications of periods of magnetization and demagnetization.
Figure 10A:
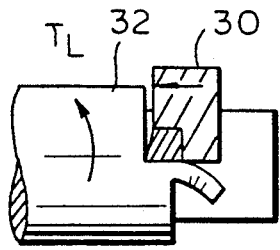
FIGS. 10A, 10B, and 10C show the tool and workpiece interacting during the periods depicted in FIG. 9, in accordance with the present invention.
Figure 10B:
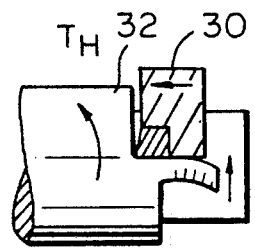
Figure 10C:
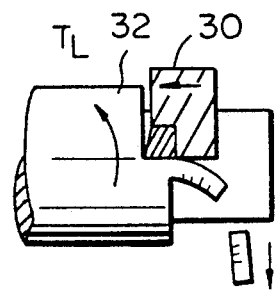

As illustrated in the graph in FIG. 9, periodical magnetization takes place during a cycle t during periods TH and demagnetization during periods TL. This is illustrated in FIGS. 10A–10C where a workpiece 32 is shown as a rotating cylinder with the arrow thereon illustrating the direction of rotation. Cutting the machining chips from workpiece 32 is tool 30. The arrow on tool 30 is not meant to denote movement of the tool but is there to show the forces creating the shearing force discussed herein. Any movement of the tool is not an oscillatory movement but when present is to advance the cut into the workpiece, although the workpiece could be moved against the tool without changing the effect of the present invention. In FIG. 10B magnetization of tool 30 is taking place as shown by the chip pressed against the tool. In FIGS. 10A and 10C there is demagnetization TL where the chip is effected by the shearing forces without magnetization and therefore moves away from tool 30 and breaks in FIG. 10C.

In addition, the present invention can be provided with a greater direct current magnetizing voltage, which causes the electromagnetic coil 24 to generate a greater magnetic force in order to suit the needs of the various work pieces having different magnetic coefficients and the various machining conditions. Therefore, the twisting and the wafting of a machining chip can be eliminated by the action of the magnetic field of the machining tool.

Figure 6:
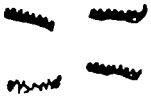
FIG. 6 is a table showing the test results of the apparatus of the present invention, which was operated under different machining conditions.
Figure 6:
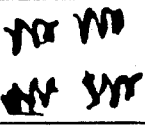
Figure 6:
Figure 6:
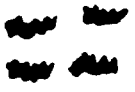
Figure 6:
Figure 6:
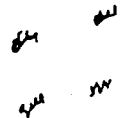
Figure 6:
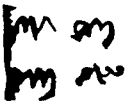
Figure 6:
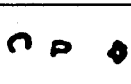
Figure 6:

According to the description of the present invention presented above, the application of the apparatus and the method of the present invention is independent of the geometric shape of the machining tool. In other words, the present invention has successfully overcome the shortcomings of the prior art, as exemplified by the test results of the present invention, as shown in FIG. 6.

Figure 7:
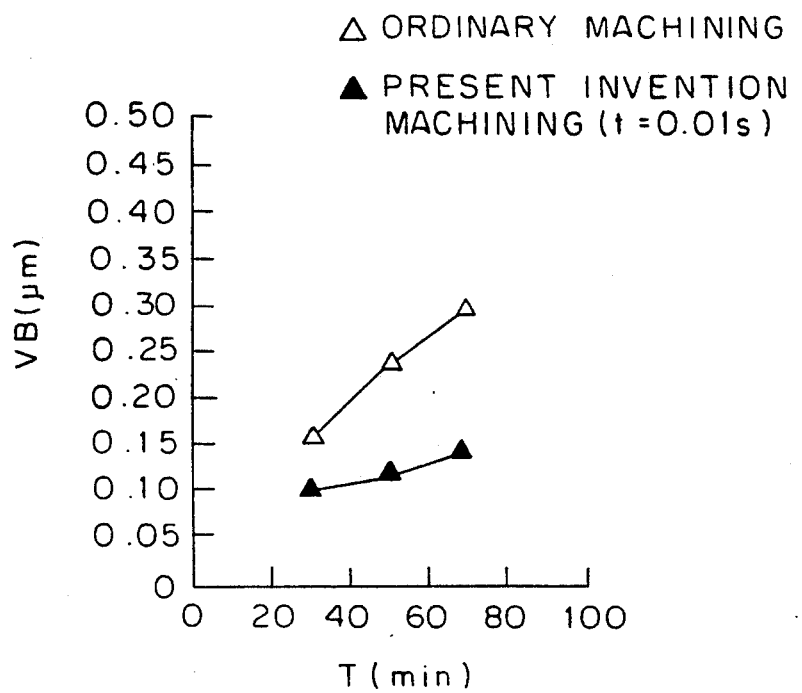
FIG. 7 shows two curves, each of which represents respectively a relationship between the machining time and the wear of the tool belly, according to the prior art and the present invention.
Figure 8:
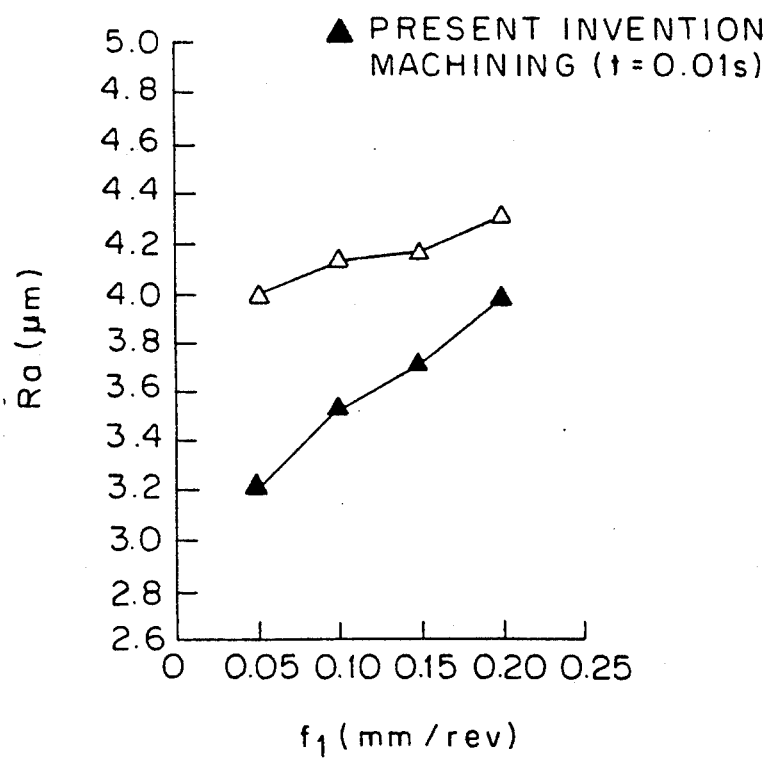
FIG. 8 shows two curves, each of which represents respectively a relationship between the feed amount of the tool and the average roughness value, according to the prior art and the present invention.

As shown in FIGS. 7 and 8, the present invention can reduce the wear of the machining tool and improve the surface roughness of the machined product. The test results of the prior art and the present invention are shown comparatively in FIGS. 7 and 8. Such test results were obtained under the same conditions, such as the lathed materials being SAE1055, the geometric shapes of the machining tools being $-5°, -5°, 5°, 5°, 5°, 5°, 0.8$ mm, the machining depths being 0.3 mm, and the machining speeds being 50 m/min.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the hereinafter appended claims.

What is claimed is:

1. An apparatus for use in controlling machining chips and the length of such chip while using a machining tool against a moving workpiece comprising
   a lathe tool support;
   an electromagnetic tool mount mounted on said lathe tool support;
   an oscillator circuit electrically connected to said electromagnetic tool mount;
   said electromagnetic tool mount including
      a set of clamping means to receive and position the machining tool on said lathe tool support stationary relative to said support, said machining tool engaging said workpiece to produce machining chips,
      and an electromagnetic coil adjacent said clamping means electrically connected to said oscillator circuit,
      said electromagnetic coil having a hole centrally therethrough receiving the machining tool therethrough;
   said oscillator circuit receiving power from a connected power supply and including
   an oscillator means for generating an electrical oscillation signal to control a periodical alternating interruption and resumption of electrical power to said electromagnetic coil;
   said electromagnetic coil magnetizing the machining tool when electrical power is delivered through said oscillator means and the machining tool demagnetized when no electrical power is delivered to said electromagnetic coil to magnetize a machining chip causing a magnetically induced thrust and a shearing force to cause the machining chip to be broken by such forces.

2. The apparatus of claim 1 wherein amplifying means including a power transistor is connected to said oscillator means to amplify said electrical oscillation signal.

3. The apparatus of claim 1 wherein said oscillator circuit includes at least one variable resistor means to adjust a cycle with resumption of electrical power to said electromagnetic coil.

4. The apparatus of claim 1 wherein said oscillator circuit includes a direct current adjusting circuit means including an auto-transformer to control an input of direct current into said electromagnetic coil for magnetizing the machining tool.

5. A method for controlling machining chips and the length of such chip while using a machining tool against a moving workpiece comprising the steps of
   positioning the machining tool through an electromagnetic coil on a lathe tool support stationary relative said lathe tool support;
   producing a shearing force by moving the workpiece against the machining tool to shear a chip from said workpiece;
   and simultaneously periodically magnetizing and demagnetizing the machining tool by providing an oscillating electrical current to the electromagnetic coil to thereby in turn periodically magnetize a machining chip;
   thereby breaking the machining chip by magnetically induced thrust in conjunction with the shearing force.

6. The method of claim 5 further comprising the step of
   amplifying an oscillator signal to provide said oscillating electrical current.

7. The method of claim 5 further comprising the step of
   adjusting the cycle of resumption and interruption of power with a variable resistor.

8. The method of claim 5 further comprising the step of
   controlling with an auto-transformer an input of direct current into the electromagnetic coil for magnetizing the machining tool.

* * * * *